United States Patent [19]

Grundy

[11] 4,000,872
[45] Jan. 4, 1977

[54] ADVANCE TRAIN LINE REGISTER FOR A TRAIN SPEED REGULATION SYSTEM

[75] Inventor: Reed H. Grundy, Murrysville, Pa.

[73] Assignee: Westinghouse Air Brake Company, Swissvale, Pa.

[22] Filed: May 27, 1975

[21] Appl. No.: 581,370

[52] U.S. Cl. .................. 246/182 R; 235/150.2; 235/92 CC; 235/92 SH
[51] Int. Cl.² ................................ B61L 3/20
[58] Field of Search ...... 235/150.2, 150.24, 92 CC, 235/92 CV, 92 SH, 92 MS; 246/636, 167 R, 182 R, 182 B, 187 R, 187 C; 340/48, 347 DA; 317/5

[56] References Cited

UNITED STATES PATENTS

| | | | |
|---|---|---|---|
| 3,268,727 | 8/1966 | Shepard | 246/187 B |
| 3,482,089 | 12/1969 | Raffel et al. | 246/182 R |
| 3,800,139 | 3/1974 | Clark | 246/182 C |
| 3,891,833 | 6/1975 | Rhoton et al. | 246/182 C X |

FOREIGN PATENTS OR APPLICATIONS

1,365,989 6/1964 France .................. 246/187 C

*Primary Examiner*—Stephen G. Kunin
*Attorney, Agent, or Firm*—A. G. Williamson, Jr.; R. W. McIntire, Jr.

[57] ABSTRACT

Clock pulses representative of the velocity error between desired and actual train speeds drive an advance train line (ATL) register to count up or down, in accordance with the sign of the error, between zero and a selected maximum count position. The existing total count is continuously applied to a D/A converter to provide a stepped analog signal which drives an advance train line channel to vary the propulsion effort of the train, car by car, to the next adjacent level, increasing or decreasing per the direction of the counting action. Attainment of either count limit by the ATL register generates, through logic circuitry, a clock pulse to drive the associated propulsion train line (PTL) encoder in the same direction to its next propulsion condition. The ATL register is reset to the opposite count limit during generation of the PTL clock pulse, to continue the stepped variation of the propulsion level in the same direction. The previously achieved full ATL propulsion level is meanwhile held until the PTL encoder shifts to the equivalent base condition. All ATL counting action is inhibited by various saturated conditions within the PTL encoder.

14 Claims, 3 Drawing Figures

ADVANCE TRAIN LINE REGISTER FOR A TRAIN SPEED REGULATION SYSTEM

BACKGROUND OF THE INVENTION

My invention pertains to an advance train line register control arrangement for a train speed regulation system. More specifically, the invention pertains to an advance train line register which provides analog signals to an advance train line encoder to control train propulsion means to increase or decrease train speed in discrete steps and which also provides clock pulses for actuating an associated propulsion train line encoder.

The prior art technology in rapid transit operation uses a parallel-series tractive effort control system. In this arrangement, the four propulsion motors and associated control resistors on each car of a train are initially connected in series across the power source. To increase power and therefore speed, the control resistors are cut out in steps, and then the motor field energy is weakened. Following this, the motors are switched to a parallel-series combination, normally with two parallel pairs of motors connected in series across the power source with the same control resistors. Once again, each resistor is again cut out in steps, and then the motor fields are weakened, all of this increasing the speed of the train. Obviously, a reverse order of this stepping action occurs when train speed is being decreased gradually, although the complete shut-off of the propulsion motors is always possible in an emergency. Originally, and still existing in some older rapid transit systems, the motorman or train operator manually controls the train speed from a single position in the lead car using switching contactor apparatus. Each car of the train is controlled simultaneously to the same propulsion condition through train line wires running the length of the train and automatically connected from car to car when the cars are coupled together to form the train. Subsequently, a variable control of propulsion effort was developed in which variations of the propulsion level exist throughout the train. In other words, the level of propulsion effort on each car is controlled semi-independently of the level existing on other cars of the train. For example, the propulsion motors on every other car may be cut out in order to reduce the total tractive effort. However, an even more sophisticated variable control arrangement is desirable for automatic train operation. For example, it is desirable that each car individually advance to the next higher power state than that called for by the propulsion train line control, with this propulsion advance stepped car by car from the leading car to the rear of the train. Such a car by car advancing of the propulsion or tractive effort requires an advance train line channel, separate and distinct from the regular propulsion train lines. This separate, advance train line channel must be controlled by an encoder arrangement to establish a particular step level in accordance with the number of cars of the train which are to be advanced or retarded from the existing propulsion or tractive effort base established by the regular propulsion train line apparatus. The advance train line encoder must also signal the propulsion train line apparatus when the maximum advance has been reached, that is, when all the cars are at the same advance level, so that the base propulsion level then may be shifted and the advance procedure restarted. This car by car advance control must also be capable of reducing the propulsion effort from the previously selected level to a lower tractive effort car by car and then causing the propulsion train line apparatus to reduce its base selection to that lower total level.

Accordingly,, an object of my invention is an advance train line control apparatus which varies the train propulsion level car by car throughout a train.

Another object of the invention is an advance train line control arrangement responsive to propulsion demand signals to advance the propulsion power level car by car in a rapid transit train and to activate propulsion train line apparatus when the maximum advance to the next higher propulsion level is achieved to register the increase to that level.

A further object of my invention is advance train line apparatus for a rapid transit train to advance or retard the propulsion level of the train in one car steps above or below, respectively, the base propulsion level established by the regular propulsion train line apparatus.

Still another object of the invention is advance train line apparatus to advance or retard the propulsion level of a rapid transit train by one predetermined step, sequentially car by car and to activate the propulsion train line encoder to the next higher or lower propulsion level, respectively, when the maximum variation in either direction has been reached by the advance train line apparatus.

Also an object of the invention is advance train line control apparatus for a rapid transit train which, upon receipt of a velocity brake error signal, advances or retards the propulsion level of the train, in accordance with the direction of the error, in single car steps from the existing base level established by a propulsion train line signal, further activating the propulsion train line apparatus to the next higher or lower base level when the propulsion effort of all cars has been varied one step.

Yet another object of the invention is advance train line apparatus for a train speed regulation system which counts clock pulses representing a velocity error between desired and actual speeds of the train, adding or subtracting each pulse in accord with the state of a direction signal representing the under or over speed status of the error, converts the digital pulse count into a stepped analog signal to drive an advance train line channel apparatus to vary the propulsion level car by car, and generates a clock pulse at the completion of each full cycle of step varying of the train propulsion effort, either increase or decrease, to step an associated propulsion train line encoder to a corresponding base propulsion level.

Other objects, advantages, and features of my invention will become apparent from the following specification when taken in connection with the accompaning drawings and appended claims.

SUMMARY OF THE INVENTION

The function of the advance train line (ATL) register is to provide a modulo five counter which receives clock pulses representative of a speed error, totalizes them, converts the total count into an analog signal for use by the advance train line control apparatus while also providing the timing and logic necessary for the proper operation of a propulsion hold relay, and synchronously providing other clock pulses to the propulsion train line encoder. The clock pulses are received from a velocity brake error apparatus when a difference exists between the desired or allowed and the actual train speeds. These clock pulses are applied to an ATL register, a four-bit counter which counts up or down in accordance with a received up/down signal representative of the positive or negative value of the speed difference, that is, as an under or over speed condition exits. In order to energize and control the hold relay and transmit clock pulses to the propulsion train line (PTL) encoder, only the detection of the upper and lower limit conditions of the count register are needed. Logic apparatus is provided to register both the full and counting-up condition and, conversely, the empty and counting-down condition of this ATL register. Means are also provided for decoding the registry of these two limit conditions. The detection of either limit actuates a timing action to provide two selected periods. In producing these timing periods, a multivibrator is activated and its output counted. Half of the preselected total count measures a first timing period while the remainder of the count comprises the second timing period. The timing pulses and the up/down signal are applied to a logic network which responds to supply clock pulses to the PTL encoder and activates the energizing signal for the hold relay. During the first timing pulse, the ATL register or counter is also inhibited from further counting operation.

In addition to this clock pulse and hold relay control, the existing output of the ATL counter in binary code form is also applied to a digital to analog (D/A) converter. Specifically, the binary digits from the counter output are applied to a resistor network which is weighted in accordance with the binary code digit position. The sum of the binary digits as summed by the resistor network is applied through an amplifier to control the conduction level of a transistor to provide a stepped output of the D/A converter which is then fed to an advance train line. Each step of the binary count thus increases or decreases the value of the voltage or current in the advance train line. Each step change in the advance train line signal level actuates the next car in sequence to shift its tractive effort up or down to the next preset propulsion level. If a train longer than normal is in use, the value of each ATL signal step is doubled to actuate two cars at a time to shift their propulsion level. The hold relay causes all cars to hold in an existing propulsion level when a full train shift has occurred until the propulsion train line encoder can be shifted to the next base control level. When the next level is established in the PTL apparatus, the advance train line arrangement then resets and prepares to further shift the propulsion level in the same step by step, that is car by car, manner.

DESCRIPTION OF THE ILLUSTRATED EMBODIMENT

I shall now describe in greater detail a specific and preferred arrangement of the apparatus embodying my invention as illustrated in the accompanying drawings, in which:

FIG. 2 is a timing chart illustrating the operation of the apparatus of FIG. 1.

Figure 1A:
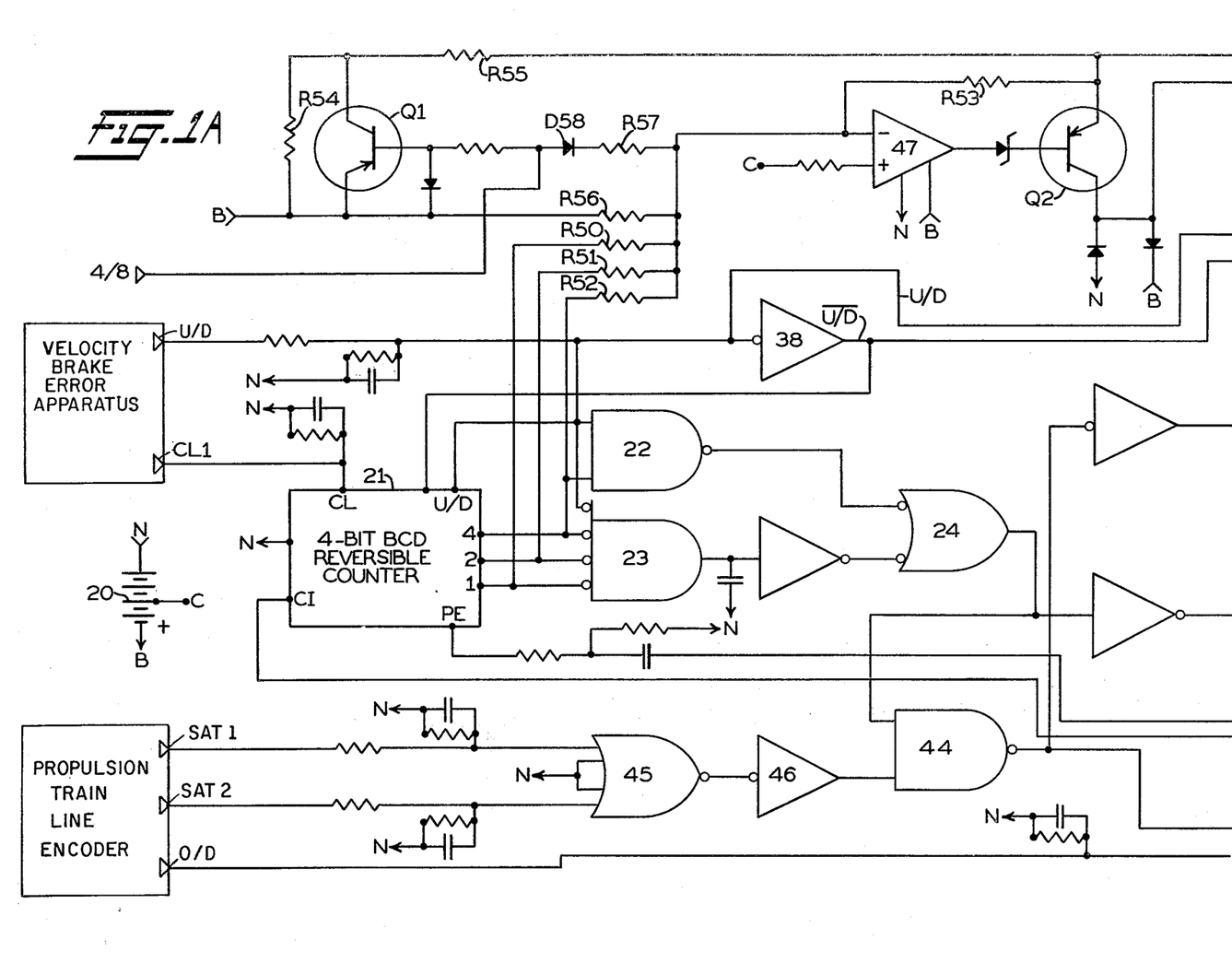
FIGS. 1A and 1B, when arranged adjacent end to end with FIG. 1B to the right, show by logic diagram form the advance train line register and encoder apparatus embodying my invention.
Figure 1B:
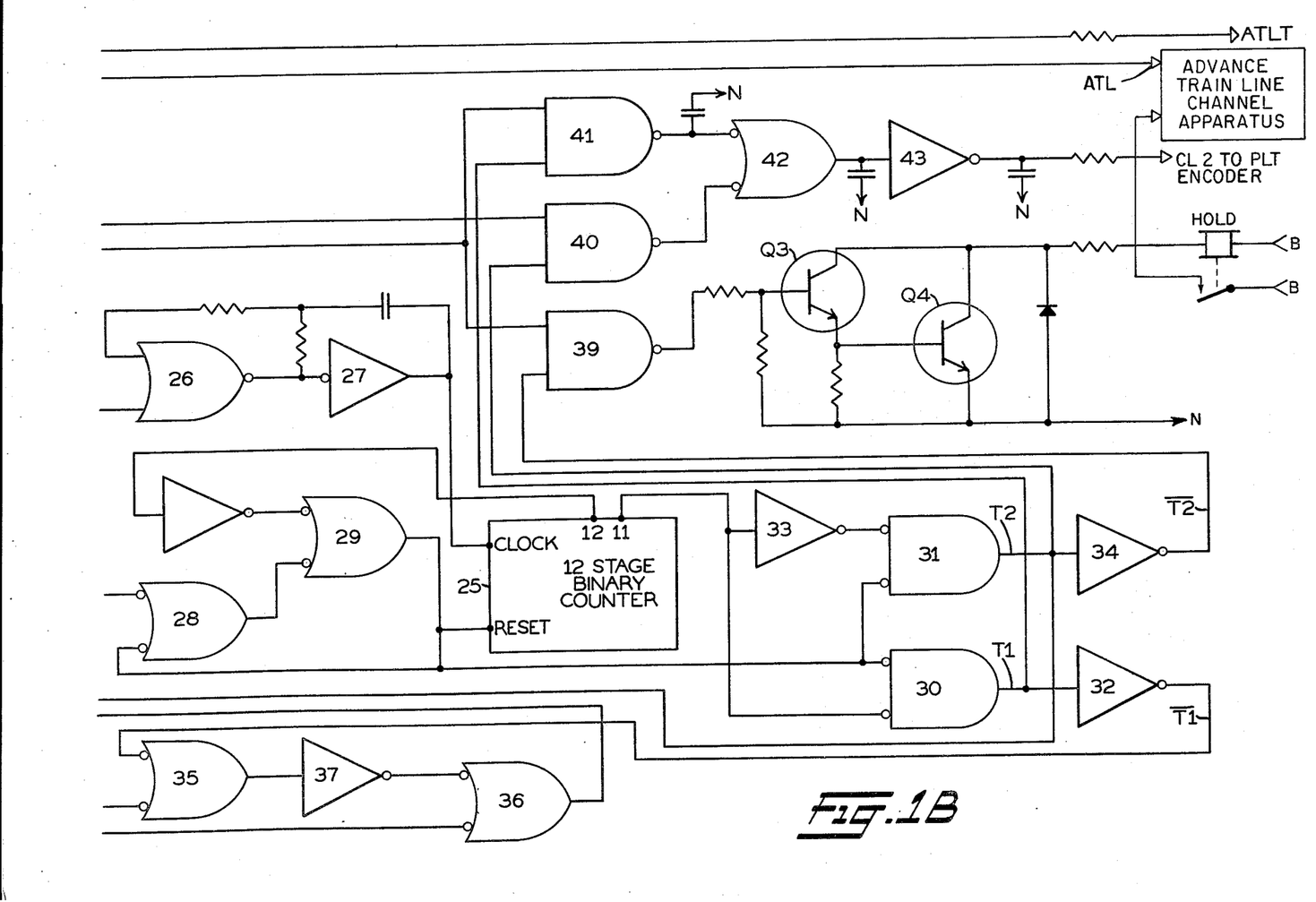
Figure 3:
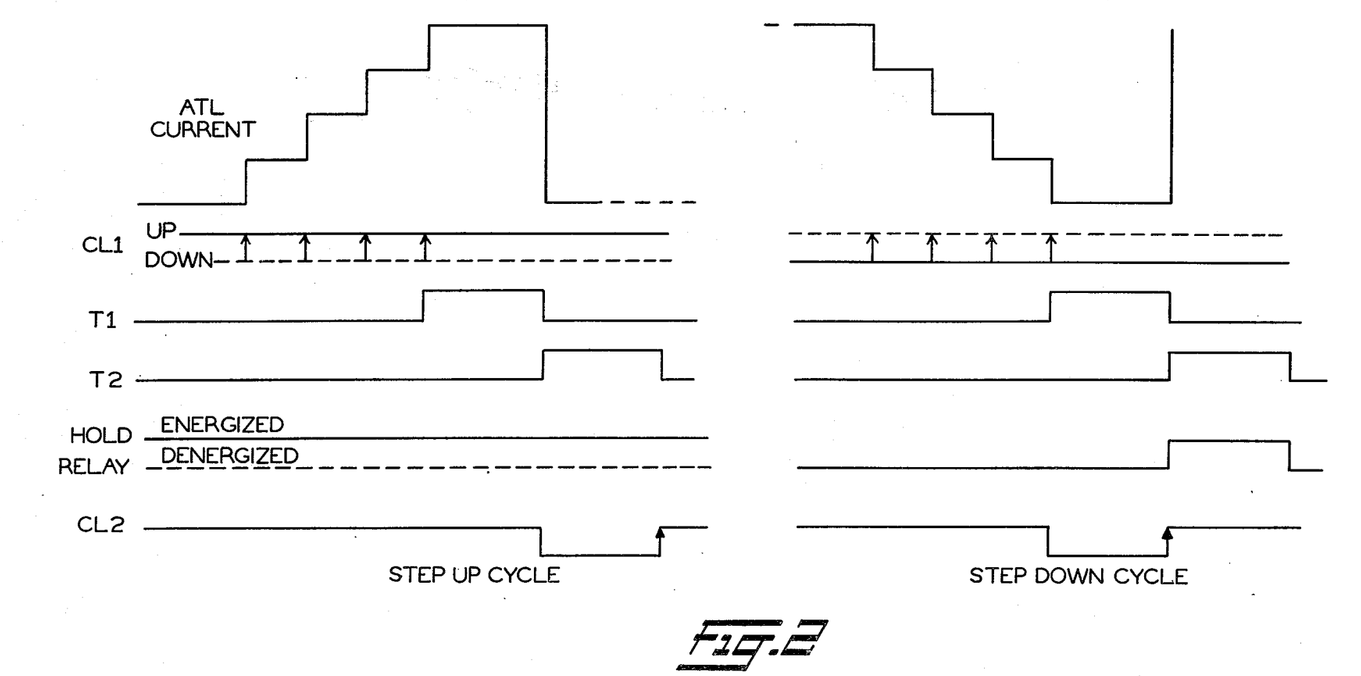

In each of the figures of the drawings, similar reference characters designate the same function or operation of the apparatus. In FIG. 1, a source of low voltage, direct current operating energy is supplied by the battery 20, shown at the left of FIG. 1A, which is provided with a positive terminal B, a negative terminal N, and a center tap terminal C having a potential between that of terminals B and N. Where these reference characters appear elsewhere in the logic diagram, they designate a connection to that specific terminal of the direct current source. Obviously, any conventional direct current source providing the proper voltage and terminal connections and with sufficient capacity may be used. In the logic diagram of FIGS. 1A, 1B, a small triangle is used to designate the input and output terminals of the illustrated ATL apparatus, the distinction being designated by the direction of the point of the triangle. Some of these terminal symbols are shown in connection with conventional blocks representing associated apparatus in the complete train speed regulation system. Conventional logic symbols are used for the AND, NOR, and amplifier/inverter circuit elements but for other logic circuitry illustrated by a block, a specific designation is included to designate the operation and type of the apparatus. Preferably integrated circuit components are used but the invention is not limited to the use of such elements.

Clock pulses to operate the advance train line register apparatus are applied to the input terminal designated CL1 at the left of FIG. 1A. These input pulses represent a difference between the desired or allowed speed for the train and the actual train speed. The greater the magnitude of the difference or propulsion error, regardless of direction, the higher the frequency of the clock pulses CL1. When the ATL apparatus herein disclosed is normally used in a Station Stop and Speed Regulation System For Trains, as disclosed in my copending application Ser. No. 581,369, filed the same date as this application and having the same assignee, the CL1 pulses are received from a velocity brake error, (VBE) component of the total system, shown here by a conventional block. However, all that is necessary to understand here is that clock input pulses appear at terminal CL1 as long as the actual and allowed train speeds differ, at least by some predetermined minimum amount. It is to be noted that, in the total system, a common direct current energy supply, such as battery 20 already discussed, will provide operating energy for all the apparatus on board the trin so that common connections for return circuits to the energy source exist between all the apparatus.

The CL1 pulses are applied to input terminal CL of a register element 21 which serves as a four-bit BCD reversible counter. The resulting count within this unit 21 is up or down, that is, increases or decreases in accordance with the high or low condition of the input signal at terminal U/D of the counter. This U/D signal is supplied over the apparatus input terminal U/D from, for example, the previously mentioned velocity brake error unit of the automatic train operation system. For an understanding of the present invention, however, it is only necessary to understand that the up/down signal U/D, developed in conjunction with the CL1 clock pulses, represents the direction of the train speed or propulsion error and is of a high or low level as the actual speed is less than or more than the allowed speed, respectively. In other words, signal U/D is high or low as the count must increase or descrease to raise or lower the actual speed, respectively. Operation of the counter is inhibited, regardless of input, if a high level signal is applied to the count inhibit terminal CI. A low level signal is normally applied to this inhibit terminal of the counter to enable the counting operation. Output terminals 1, 2, and 4 supply a BCD output signal in the conventional manner depending upon the level of the registered count. The references for these binary output terminals are numberically weighted in accordance with the code output from the counter unit for convenience in the following explanation.

For the purpose of the advance train line apparatus developing a clock pulse for the propulsion train line encoder device of the automatic train operation system, only the extremes or limits of the counting action need to be detected and/or decoded. Thus the upper limit count of four and the counting up condition is decoded or detected by an AND element 22 while the count of zero and the counting down condition are decoded by the associated AND unit 23. Remembering that the up or down counting condition is determined by a high or low level signal, respectively, from the ATL input terminal U/D and that a high level signal output is supplied from the counter on the weighted code terminals when each is active, the operation of units 22 and 23 will be obvious from an inspection of the drawing.

When the register counter reaches either limit, that is, counts 4 or O, it initiates a timing action which is divided into consecutive timing periods T1 and T2. Counter 21 must be inhibited during period T1 as shown in the chart in FIG. 2 to allow the necessary time to develop the pulse output for the PTL encoder. The actual timing action is accomplished by a twelve-stage counter unit 25 and a multivibrator network comprising principally the NOR circuit 26 and inverting amplifier 27 together with their interconnecting circuitry. The counter and multivibrator combination is controlled by a toggle network comprising NOR elements 28 and 29. When the reset terminal of unit 25 is supplied with a high level signal, the counting operation of this unit is inhibited. This is a normal condition due to the feedback arrangement through the toggle network. When an output occurs form either AND element 22 or 23, as a count limit is detected, this activates an output from NOR element 24. The inverted output signal from unit 24 flips the toggle network so that the reset terminal of counter 25 goes to a low level. Counter 25 then begins to register the pulse output of the multivibrator applied to its CLOCK input. When counter 25 fills, its output terminal 12 goes to a high level condition. This resets the toggle network which in turn applies to reset pulse to counter 25. The counter then resets to zero and holds until the next timing pulse is activated.

The operation of the ATL apparatus requires that the full timing period of counter 25, that is, the time required for it to completely fill, be divided into two relatively equal timing periods, the periods T1 and T2 previously mentioned. To achieve this division into two timing periods, the output from terminal 11 of counter 25 is used together with a logic network comprising AND elements 30 and 31. Terminal 11 of unit 25 operates or shifts to a high level condition in approximately one-half the time interval required for the high level condition to occur on terminal 12. Timing period T1 then exists while the toggle and terminal 11 outputs are both at a low level, that is, the reset input to unit 25 is low and the half count condition is not yet reached. This period is designated by a high level output from AND element 30, due to the low level inputs, which continues until terminal 11 of unit 25 goes to its high level condition. It is to be noted that inverter 32 provides an inversion of time signal T1 which is normally at a high level but exists at a low level during the actual timing period. The T2 period is obtained by using the high level condition of terminal 11 of unit 25 while the reset input to this counter remains low. This condition is detected by supplying the two inputs of AND element 31 from terminal 11 through inverter 33 and direct from the toggle arrangement. While both inputs are low, the result is a high level output from unit 31 which represents period T2. Since terminal 12 goes to its high condition and resets unit 25 approximately $2^{11}$ pulses later, that is, later than terminal 11, period T2 is approximately equal to period T1. Again it is to be noted that inverter 34 provides an inversion of signal T2 which is normally high except during the actual timing period.

The inhibiting of counter 21 during any timing period T1 is controlled by the inhibit network including NOR elements 35 and 36 and an inverter 37. The inverted T1 signal from inverter 32, which is at low level during period T1, is applied to one input of NOR element 35. This low level input results in a high level output from NOR element 36 which is applied directly to terminal CI of counter 21. This high level signal inhibits further counting action by unit 21. At the end of a period T1, removal of the high level signal from input terminal CI and the application of a T2 pulse to the input terminal PE of unit 21 resets or sets this counter to its opposite condition. For example, referring to FIG. 2, it is to be noted, in the step of cycle shown to the left, that upon the initiation of period T2, counter 21 is reset from its high level of 4 to a 0 level. Conversely, during a step down cycle, initiation of the period T2 results in the insertion of a full count of 4 into counter 21, thus shifting it from a zero level to its maximum level.

Still referring to FIG. 2, it is to be seen that the timing pulses T1 and T2, together with the condition of the up/down line U/D, control the correct sequencing of the output of the CL2 pulses to the PTL encoder and also control the energization of the HOLD relay. The HOLD relay is held energized during an up counting condition by inverting the U/D signal input through inverter 38 so that a low level signal is applied to the upper input of AND element 39. The inverted output of this element is then at a high level so that it holds transistor Q3 and Q4 conducting and in a saturated condition. With transistor Q4 conducting, a circuit is completed to allow energy from terminals B and N to flow through the HOLD relay winding. During a down counting condition, the HOLD relay is energized only during timing period T2. This occurs since the inverted U/D signal is continuously at a high level and thus it is not until the inverted T2 signal goes low, which occurs only during the timing period, that the output of AND circuit 39 goes to a high level to fire transistor Q3 and thus cause transistor Q4 to conduct to complete the circuit for HOLD RELAY. When the front contact of the HOLD relay is closed, energy is supplied to the ATL apparatus to retain the variation in propulsion level achieved during the just completed cycle of operation of the ATL register until the PTL encoder fully responds to the associated CL2 pulse to establish the corresponding base propulsion level. If a down counting condition continues to exist, the HOLD relay releases at the end of timing pulse T2 to free the ATL apparatus to further reduce the propulsion level.

A logic network including AND elements 40 and 41, NOR element 42, and inverter 43 provides clock pulses CL2 to the PTL encoder in the proper time sequence. It is to be noted, with reference to FIG. 2, that an effective CL2 pulse occurs when the CL2 output terminal of the ATL apparatus returns from a low level to a high level signal. Referring to FIG. 2, during an up count condition, this CL2 pulse occurs the time period T2 after the ATL register is reset. However, with a down counting condition, a CL2 pulse occurs simultaneously with the ATL register reset. The inverted outputs of AND elements 40 and 41 are normally at a high level since the T1 and T2 inputs applied, one to each of the lower inputs of these AND elements, are normally at a low level. The CL2 terminal thus is normally at a high level with the output of the AND elements being conditioned through NOR element 42 and inverter 43 to create this condition. It is apparent that, if the output of either AND element 40 and 41 goes to a low level, terminal CL2 also becomes a low level signal. During an up count, unit 40 governs the CL2 terminal with input U/D remaining high but signal T2 being initially low. Thus during period T2, when the T2 input to AND element 40 is also at a high level, the output is low and therefore terminal CL2 goes low during the duration of period T2. Obviously, terminal CL2 returns to its high level condition at the end of period T2 and provides an effective pulse to the PTL encoder.

Conversely, during a down count condition, the inverted U/D input to AND element 41 remains high while the U/D signal remains low at its input to element 40 to hold the inverted output of this AND circuit high. Thus prior to period T1, the output of unit 41 is high since its input from signal T1 is low. At the beginning of the time period, signal T1 goes high and since both inputs to unit 41 are then high, its output is low. This creates a low signal condition at output terminal CL2. At the end of period T1, the output of unit 41 again goes to high level and terminal CL2 returns to its high level condition. This low to high transition at terminal CL2 creates a clock pulse for application to the PTL encoder. FIG. 2 illustrates, in chart form, this timing sequence of the occurrences of CL2 clock pulses during the up and down counting conditions.

When counter 21 reaches either of its preselected count limits, the upper input of AND element 44 receives a high level signal from the output of NOR element 24. The outer inputs to element 44 are controlled by saturation signals from the PTL encoder, shown conventionally in the lower left of FIG. 1A, over the ATL apparatus input terminals SAT 1 and SAT 2. The full explanation of these saturation signals is included in the copending application of R. H. Grundy and J. J. Pierro for Propulsion Train Line Encoder For A Train Speed Regulation System, Ser. No. 581,224, filed the same date as this application and having the same assignee. However, defining very briefly, one or the other of these inputs receives a high level signal from the PTL encoder when it reaches the maximum base propulsion level or, under restricted speed conditions, a preselected lesser base propulsion level capable of achieving the lower allowed speed limit is reached. Saturation signals are thus received only in the up counting condition. Obviously when either SAT input receives a high level signal, a high signal is applied to the lower input of AND element 44. Therefore, when the ATL register 21 counts up to a full 4 count and the PTL encoder apparatus is full in accordance with the existing allowed speed conditions, a SAT 1 or SAT 2 signal is received and both inputs to AND element 44 become high. A low signal is then applied to the lower input of NOR element 35 which results in high level output from NOR element 36 which is applied to the input terminal C1 of unit 21 to inhibit further counting operations by this register element. A zero and down signal of a similar nature is received from the PTL encoder apparatus at terminal O/D when a down counting condition exists and the train propulsion effort reaches a zero level. This O/D input is normally at the high level and goes to the low level when the actual condition exists in the PTL encoder. This low input to NOR element 36 creates a high signal level output which is applied to the ATL register input C1 to inhibit further counting operation.

The stepped current applied by the apparatus of FIG. 1 to the advance train line extending through the train, and as illustrated across the top of the chart in FIG. 2, is controlled by the ATL encoder portion which is a digital analog (D/A) converter arrangement comprising transistor Q2, amplifier 47, and resistors R50, R51, and R52. As will become apparent, since the input of the ATL encoder requires an input current to balance against a feedback current for purposes of regulation, the analog portion of the D/A converter is a current source as opposed to a voltage source. The output of counter 21, in binary code form from output terminals 1, 2, and 4, is fed to the D/A converter through resistors R50, R51, and R52. The values of these resistors are so weighted that the output current of transistor Q2 is a decimal equivalent of the binary output of unit 21.

When counter 21 is at its zero state or count condition, the outputs are all at the negative potential of terminal N. Since the positive terminal of amplifier 47 is connected to terminal C of the source and the amplifier is connected in a negative feedback mode, the output or feedback resistor R53 will try to achieve a potential such that the currents into the negative terminal of the amplifier balance with a potential of approximately the voltage of terminal C. Transistor Q2 thus forms a constant current source by virtue of the fact that the voltage across its emitter is closely controlled by this feedback resistor R53 and amplifier 47. Thus, when the output terminals of unit 21 are all at the negative potential, the maximum negative current flow from the negative terminal of amplifier 47 is in effect. To compensate for this, the maximum positive current flow through the feedback resistor R53 must also take effect. Thus the emitter end of resistor R53 must rise to a high voltage with respect to terminal C of the source in order to balance the total of the currents drawn by resistors R50, R51, and R52. The collector current from transistor Q2 that is fed through output terminal ATL to the conventionally shown Advance Train Line Channel Apparatus on each car of the train (upper right of FIG. 1B) is a function of the total voltage drop across resistors R54 and R55 which are of equal value. Thus, when the emitter end of resistor R53 is at its high potential, the voltage drop across resistors R54 and R55 is at the lowest potential. Thus a zero or low current condition exists at the collector of transistor Q2.

Conversely, when output terminal 4 of unit 21 switches to a high level signal as a result of an upper limit count, the potential across resistor R52 is reduced to zero. Thus, the negative current flow out of the inverting or negative input terminal of amplifier 47 is reduced, causing the emitter of transistor Q2 to lower in potential so that the feedback current through resistor R53 is again in balance. The lowering in potential of the emitter of transistor Q2 increases the voltage drop across resistors R54 and R55. Therefore, it will increase the collector current of transistor Q2 which is applied over output terminal ATL. At intermediate count levels, the output of counter 21 causes the emitter of transistor Q2 to assume voltage levels between its maximum and minimum levels at counts 4 and 0. The value of ATL current is then at intermediate step levels as shown in FIG. 2.

As previously discussed, the current as supplied from terminal ATL is a function of the voltage of source terminal B minus the emitter voltage of transistor Q2 divided by the total emitter resistance. For a four-car train, the current steps from terminal ATL should be one-half those supplied for an eight-car train, these being conventional arrangements of rapid transit cars into trains. Therefore, transistor Q1 is provided to reduce the emitter resistance to half value for an eight-car set up. The conducting condition of this transistor is controlled by the level of the signal applied to a train length selector input terminal 4/8, which signal is adjusted in accordance with the number of cars included in the train arrangement being controlled by the automatic train operation apparatus. Resistors R54 and R55 provide the adjustment used to determine voltage per step while resistors R56 and R57 provide an adjustment used to establish the current at zero volts on the ATL line. In the four-car mode of operation, input terminal 4/8 is at a high level, thus shutting off transistor Q1 and applying through diode D58 and resistor R57 a singal which is used to adjust the zero output current for this size of train. When input terminal 4/8 is at a low level, as for an eight-car train combination, transistor Q1 conducts and diode D58 blocks resistor R57 so that the current per step and the zero count point are determined by resistors R55 and R56 only. A test point output terminal ATLT, which is necessary for maintenance purposes since it is difficult to read the current flowing over the ATL line, is provided from the connection at the emitter of transistor Q2.

The ATL apparatus of my invention thus provides a stepped output to vary the propulsion level of a train in unit amounts normally equivalent to single or double car steps, in accordance with train length. The apparatus simultaneously controls the output of clock pulses to shift the existing base level of the propulsion train line when the entire train has been shifted by these unit steps to the next higher or lower level of propulsion. It also provides a hold signal to retain the new propulsion level, after the ATL apparatus is reset for renewed variation, until the PTL apparatus completes its base level shift. This entire operation is properly sequenced through preset time periods and inhibit signals. A smooth variation of train propulsion to match required speeds and other operating conditions is therefore obtained in an efficient and economic manner.

Although I have herein shown and described but one specific arrangement of advance train line apparatus embodying my invention, it is to be understood that various modifications and changes therein may be made within the scope of the appended claims without departing from the spirit and scope of my onvention.

Having described the invention, what I claim as new and desire to secure by Letters Patents, is:

1. An advance train line register apparatus for use in a train speed regulation system which also includes on each train a propulsion train line encoder to set base propulsion levels for the train, comprising in combination,
    a. a count register means responsive to the reception of clock input pulses and a count direction signal for registering the level of the pulse count by adding or subtracting each received clock pulse from the existing pulse count registry in accordance with the up/down condition of the count direction signal, and operable between zero and a predetermined maximum count limits,
    b. said count register means connected for receiving input clock pulses when a speed regulation difference exists between desired and actual train speeds and a count direction signal conditioned in accordance with the under or over status of the speed difference,
    c. a converter means connected for receiving the existing pulse count from said register means and operable for converting the total count into a stepped output signal having preselected levels increasing as the count total becomes larger and vice-versa,
    d. an advance train line output means connected for transmitting said stepped signal for changing the propulsion level of said train in successive car by car steps to a higher or lower level as said stepped signal increases or decreases, respectively, and
    e. a clock logic means controlled by said register means and responsive to either a maximum or a zero pulse count limit for generating another distinctive clock pulse to actuate a shift to a higher or lower base propulsion level for said train as the maximum or zero limit is reached, respectively, by said count register means.

2. An advance train line register apparatus as defined in claim 1 in which said clock logic means comprises,
    a. detection logic means coupled to said count register means for developing an output signal when a zero or maximum pulse count registry is detected,
    b. a timing means coupled to said detection logic means and responsive to each output signal for establishing successive first and second timing periods,
    c. clock pulse generator means coupled to said timing means and to said count direction input and responsive to the timing periods and the status of said count direction signal for transmitting a clock pulse to said propulsion train line encoder at the end of said second timing period when an increasing pulse count is completed to said maximum level and at the end of said first timing period when a decreasing pulse count is completed to said zero level.

3. Advance train line register apparatus as defined in claim 2 which further includes,
    a. an inhibit logic means controlled by said timing means for generating an inhibit signal during said first timing period and coupled for supplying said inhibit signal to inhibit the counting of said input clock pulses by said register means during said first timing period.

4. Advance train line register apparatus as defined in claim 3 in which,
    a. said timing means is coupled for resetting said register means to the opposite pulse count limit at the beginning of said second timing period to continue input clock pulse count registry after the inhibit period.

5. Advance train line register apparatus as defined in claim 1 in which,
   a. the total pulse count output of said register means is in a selected digital binary code form, and said converter means comprises,
   b. a bank of parallel resistors, one for each binary digit, connected for receiving the count output of said register means and having weighted values for developing an analog signal of equivalent value to the binary value of the register means digital output,
   c. a transistor coupled to said advance train line output means for supplying said stepped signal in accordance with the potential of its emitter electrode, and
   d. amplifier means coupling said resistor bank and said transistor and connected in ngeative feedback mode for varying the transistor emitter potential so that the stepped train line signal is the analog decimal equivalent of the digital binary output of said register means.

6. Advance train line register apparatus as defined in claim 5 in which said clock logic means comprises,
   a. detection logic means coupled to said count register means for developing an output signal when a zero or maximum pulse count registry is detected,
   b. a timing means coupled to said detection logic means and responsive to each input signal for establishing successive first and second timing periods,
   c. a clock pulse generator means coupled to said timing means and to said count direction input and responsive to the timing periods and the status of said count direction signal for transmitting a clock pulse to said propulsion train line encoder at the end of said second timing period when an increasing pulse count is completed to said maximum level and at the end of said first timing period when a decreasing pulse count is completed to said zero level, and which further includes,
   d. an inhibit logic means controlled by said timing means for generating an inhibit signal during said first timing period and coupled for supplying that inhibit signal to inhibit the counting of said input clock pulses by said register means during each first timing period,
   e. said timing means being further coupled for resetting said register means to the opposite pulse count limit at the beginning of each second timing period to continue the input pulse count after the inhibit period, and
   f. an advance train line hold means coupled to said count direction input and said timing means and responsive to the status of said count direction signal and to said second timing period for supplying a hold signal to retain the propulsion level attained by a completed stepped signal, subsequent to a count register means reset, until said propulsion train line encoder shifts to a higher or lower base propulsion level.

7. Advance train line register apparatus as defined in claim 6 which further includes,
   a. a train length selector operable between first and second train length conditions in accordance with the number of cars in the associated train,
   b. said selector connected for varying the circuit parameters for said transistor and amplifier elements of said converter means to double the value of each output step when operated to its second train length condition.

8. Advance train line register apparatus as defined in claim 7 in which,
   a. the maximum count level of said register means is four, and
   b. the first and second conditions of said train length selector correspond to four and eight car train lengths, respectively.

9. An advance train line register for a train speed regulation system, which system includes on each train a propulsion train line encoder to selectively establish one of a plurality of base propulsion levels for the train and advance train line channel control apparatus for transmitting propulsion level regulating signals to each car of the train, comprising in combination,
   a. a count register means coupled for receiving clock pulses representing a difference between desired and actual train speeds and an error direction signal representing the direction of the speed difference, and responsive thereto for registering a pulse count between zero and a selected maximum, adding or subtracting each pulse from the existing count in accordance with the state of said direction signal, and providing a digital code output equivalent to the instant count,
   b. a converter means connected for converting said digital code output into a stepped analog signal and supplying said stepped to said advance train line channel control apparatus to vary the train propulsion level car by car for each increase or decrease of the stepped signal,
   c. a timing means controlled by said register means for successively generating first and second timing signals of substantially equal periods when said register means reaches either count limit,
   d. a clock logic means controlled by said timing means and responsive also to said direction signal for transmitting another clock pulse to actuate a shift to a new base propulsion level for the train, when said register means reaches either count limit under a corresponding direction signal state,
   e. a holding means coupled to said timing means and said direction signal input and responsive to the corresponding signals for retaining the propulsion level achieved by said advance train line apparatus when said register means reaches a count limit until the corresponding base propulsion level shifts, and
   f. an inhibit means coupled to said timing means and responsive to said first timing signal for supplying an inhibit signal to halt the pulse count registry within said register means during each first timing period.

10. An advance train line register as defined in claim 9 in which said converter means includes,
   a. a bank of parallel resistors connected to receive the digital code output of said register means and having weighted values for totalizing said digital code into an equivalent analog signal,
   b. a transistor connected for supplying a signal to said advance train line channel control apparatus in accordance with the potential on the emitter electrode of that transistor, and
   c. an amplifier connected in negative feedback mode and coupling said resistor bank to said transistor for varying the potential on the transistor emitter electrode in a manner representative of th stepped analog outpt of said resistors for increasing or decreasing the train propulsion level car by car in accordance with the direction of counting by said register means.

11. An advance train line register as defined in claim 9 in which said timing means comprises,
   a. detection logic means coupled to said register means and to the direction signal input for detecting when the count limit corresponding to the existing direction signal is reached by said register means,
   b. another counter means operable when enabled for counting input pulses and providing first and second output signals during a counting action representing substantially equal pulse counts,
   c. a source of periodic input pulses coupled to said other counter means,
   d. a toggle logic network coupling said detection logic means for enabling said other counter means when a count limit is detected by said detection means, and
   e. a logic network coupled to receive said output signals from said other counter means and an enabling signal from said toggle logic network and responsive thereto for generating said first timing signal between the initial enabling of said other counter means and said first output signal and said second timing signal between said first and said second output signals,
      1. said logic network coupled to said holding means, said clock logic means, and said inhibit means for supplying said timing signals.

12. An advance train line register as defined in claim 9 in which,
   a. said inhibit means is further coupled for receiving saturation signals when said propulsion train line encoder reaches a preselected propulsion level limit which inhibits further increase in propulsion effort at the allowed speed range,
   b. said inhibit means being responsive to the reception of a saturation signal, when said register means is at a maximum count registry, for supplying said inhibit signal to said register means.

13. An advance train line register as defined in claim 12 in which,
   a. said converter means is further coupled for receiving a train length signal from said speed regulation system having a first or a second condition corresponding to the length of the train,
   b. said converter means being responsive to the reception of a second condition length signal for modifying the stepped analog signal to vary the train propulsion level in multicar steps.

14. An advance train line register as defined in claim 9 in which said inhibit means comprises,
   a. a first logic network coupled for receiving said first timing signal and responsive thereto for supplying an inhibit signal to said register means,
   b. a second logic network coupled for receiving a saturation signal when said propulsion train line encoder reaches a predetermined propulsion level limit and further coupled to said register means for receiving another limit signal when a maximum count is registered with a first state direction signal,
      1. said second logic network responsive to the simultaneous reception of both limit signals for supplying a signal to said first logic network to generate an inhibit signal,
   c. said first logic network also coupled for receiving another signal when said propulsion train line encoder reaches the zero level with a second state direction signal and responsive thereto for supplying an inhibit signal to said register means.

* * * * *

UNITED STATES PATENT OFFICE
CERTIFICATE OF CORRECTION

PATENT NO. : 4,000,872
DATED : January 4, 1977
INVENTOR(S) : Reed H. Grundy

It is certified that error appears in the above-identified patent and that said Letters Patent are hereby corrected as shown below:

Column 11, line 17, "ngeative" should be --negative-- line 28, erase "input" and insert             --output--

Column 12, line 68, "th" should be --the--

Signed and Sealed this

*Eleventh* Day of *April 1978*

[SEAL]

*Attest:*

RUTH C. MASON
*Attesting Officer*

LUTRELLE F. PARKER
*Acting Commissioner of Patents and Trademarks*